(12) United States Patent
Yen et al.

(10) Patent No.: US 7,828,255 B2
(45) Date of Patent: Nov. 9, 2010

(54) SUPPORTING RACK HAVING COMPENSATING MECHANISM

(75) Inventors: Ching-Hui Yen, Banciao (TW); Chun-Lung Chen, Banciao (TW); Hung-Wei Chang, Banciao (TW)

(73) Assignee: Syncmold Enterprise Corp., Taipei County (TW)

( * ) Notice: Subject to any disclaimer, the term of this patent is extended or adjusted under 35 U.S.C. 154(b) by 243 days.

(21) Appl. No.: 12/071,189

(22) Filed: Feb. 19, 2008

(65) Prior Publication Data

US 2009/0206212 A1 Aug. 20, 2009

(51) Int. Cl.
*F16M 11/00* (2006.01)

(52) U.S. Cl. ........... 248/162.1; 248/125.8; 248/158; 248/161; 248/123.11; 248/917; 248/919; 248/920; 248/921; 248/922; 248/923; 248/346.01; 248/346.03; 248/346.04; 248/346.06; 248/280.11; 248/284.1; 248/572; 248/297.11

(58) Field of Classification Search ............. 248/125.8, 248/158, 161, 123.11, 125.2, 919, 917, 920, 248/923, 922, 921, 346.03, 346.04, 346.06, 248/346.01, 280.11, 284.1, 572, 297.11; 361/679.21, 679.01, 679.02, 679.06, 679.12
See application file for complete search history.

(56) References Cited

U.S. PATENT DOCUMENTS

| | | | | |
|---|---|---|---|---|
| 5,119,946 A * | 6/1992 | Baker | ........................ | 211/59.3 |
| 5,791,263 A * | 8/1998 | Watt et al. | .................... | 108/138 |
| 6,769,657 B1 * | 8/2004 | Huang | .................... | 248/278.1 |
| 6,822,857 B2 * | 11/2004 | Jung et al. | ............. | 361/679.02 |
| 6,912,120 B2 * | 6/2005 | Kim et al. | ............... | 361/679.06 |
| 7,048,242 B2 * | 5/2006 | Oddsen, Jr. | ............ | 248/280.11 |
| 7,061,753 B2 * | 6/2006 | Michoux et al. | ....... | 361/679.05 |
| 7,198,237 B2 * | 4/2007 | Cho et al. | .................... | 248/133 |
| 7,336,479 B2 * | 2/2008 | Liu et al. | ................ | 361/679.27 |
| 7,478,786 B2 * | 1/2009 | Copeland | ................. | 248/284.1 |
| 7,494,104 B2 * | 2/2009 | Baek | ........................ | 248/372.1 |
| 7,497,408 B2 * | 3/2009 | Lim et al. | ................. | 248/284.1 |
| 7,497,410 B2 * | 3/2009 | Lee | .............................. | 248/398 |
| 7,597,302 B2 * | 10/2009 | Lee et al. | .................... | 248/371 |
| 2005/0184215 A1 * | 8/2005 | Lin | .............................. | 248/676 |
| 2006/0032998 A1 * | 2/2006 | Depay | ...................... | 248/291.1 |
| 2007/0195495 A1 * | 8/2007 | Kim et al. | ................... | 361/681 |
| 2007/0235601 A1 * | 10/2007 | Yen et al. | ................. | 248/122.1 |
| 2007/0262210 A1 * | 11/2007 | Oh et al. | .................. | 248/125.1 |
| 2007/0272809 A1 * | 11/2007 | Jang | ........................... | 248/133 |
| 2009/0212175 A1 * | 8/2009 | Yen et al. | ............... | 248/123.11 |

\* cited by examiner

*Primary Examiner*—Nkeisha J. Smith
(74) *Attorney, Agent, or Firm*—Rosenberg, Klein & Lee

(57) ABSTRACT

A supporting rack having a compensating mechanism includes a rack body, an action force compensating assembly, a transmission element and a supporting plate. The rack body has a base and support arms. The action force compensating assembly is provided in the rack body. The elastic element is firmly connected to the base. One end of the dragging piece is connected to the hooking plate. The rotating piece is provided on a distal end of the support arm. The other end of the dragging piece is connected to the rotating piece. One end of the transmission element is firmly connected to the rotating piece and pivoted on the support arm. Via the above arrangement, an appropriate force can be applied to the supporting plate. When the user intends to adjust the supporting plate, the elastic element can generate an effect for compensating the action force, thereby providing a better operation feeling.

11 Claims, 6 Drawing Sheets

SUPPORTING RACK HAVING COMPENSATING MECHANISM

BACKGROUND OF THE INVENTION

1. Field of the Invention

The present invention is related to a supporting rack, and more particular to a supporting rack for a display monitor or another electronic device that has a compensating mechanism for the weight of the device.

2. Description of Related Art

A supporting rack generally refers to a structure for supporting an article, which can bear forces in a vertical direction. More specifically, via connecting rods, the supporting rack can be connected to the supported articles and allows the supported articles to be positioned in a suitable position.

A conventional supporting rack utilizes a supporting plate to support a display monitor or another electronic device. The supporting rack can position the display monitor or other device to an appropriate location via connecting rods or the like. However, the display monitor has its weight, so that the user requires strenuous effort to adjust the location of the display monitor. If the applied force is insufficient, the adjustment cannot be performed successfully. If the applied force is too large, the elements within the y unit may collide with each other, causing the damage of thereof.

According to the above, the conventional supporting rack has a problem of bad operation feeling. However, the display monitor is an electronic device that needs an optimal adjustment of position to represent the best pictures or images. Thus, if the user cannot operate it easily and smoothly, he/she may have low interest in using it.

Consequently, because of the above technical defects, the inventor keeps on carving unflaggingly through wholehearted experience and research to develop the present invention, which can effectively improve the defects described above.

SUMMARY OF THE INVENTION

The object of the present invention is to provide a supporting rack having a compensating mechanism that can provide a better operation feeling for the user, thereby positioning the supporting rack to a proper position smoothly.

For achieving the object described above, the present invention provides a supporting rack having a compensating mechanism, which includes: a rack body having a base and support arms extending upwardly from the base; an action force compensating assembly provided in the rack body, the action force compensating assembly comprising at least one elastic element, a hooking plate, dragging pieces and rotating pieces, both ends of the elastic element being firmly connected to the base and the hooking plate respectively, one end of the dragging piece being connected to the hooking plate, the rotating piece being provided on the support arm, the other end of the dragging piece being connected to an outer periphery of the rotating piece; a transmission element, one end thereof being firmly connected to the rotating piece and pivoted on the support arm; and a supporting plate connected to the other end of the transmission element.

The present invention has advantageous effects as follows. Via the action of the elastic element, an appropriate force can be applied to the supporting plate. When the user intends to adjust the supporting plate, the elastic element can generate an effect for compensating the action force, so that the user can lift up the supporting plate with a smaller force and can pull down the supporting plate with a suitable force. In this way, the present invention has a better operation feeling and allows the user to position the supporting plate to a proper location smoothly.

In order to further understand the characteristics and technical contents of the present invention, a detailed description is made with reference to the accompanying drawings. However, it should be understood that the drawings are illustrative only but not used to limit the present invention thereto.

DETAILED DESCRIPTION OF THE PREFERRED EMBODIMENTS

Figure 1:
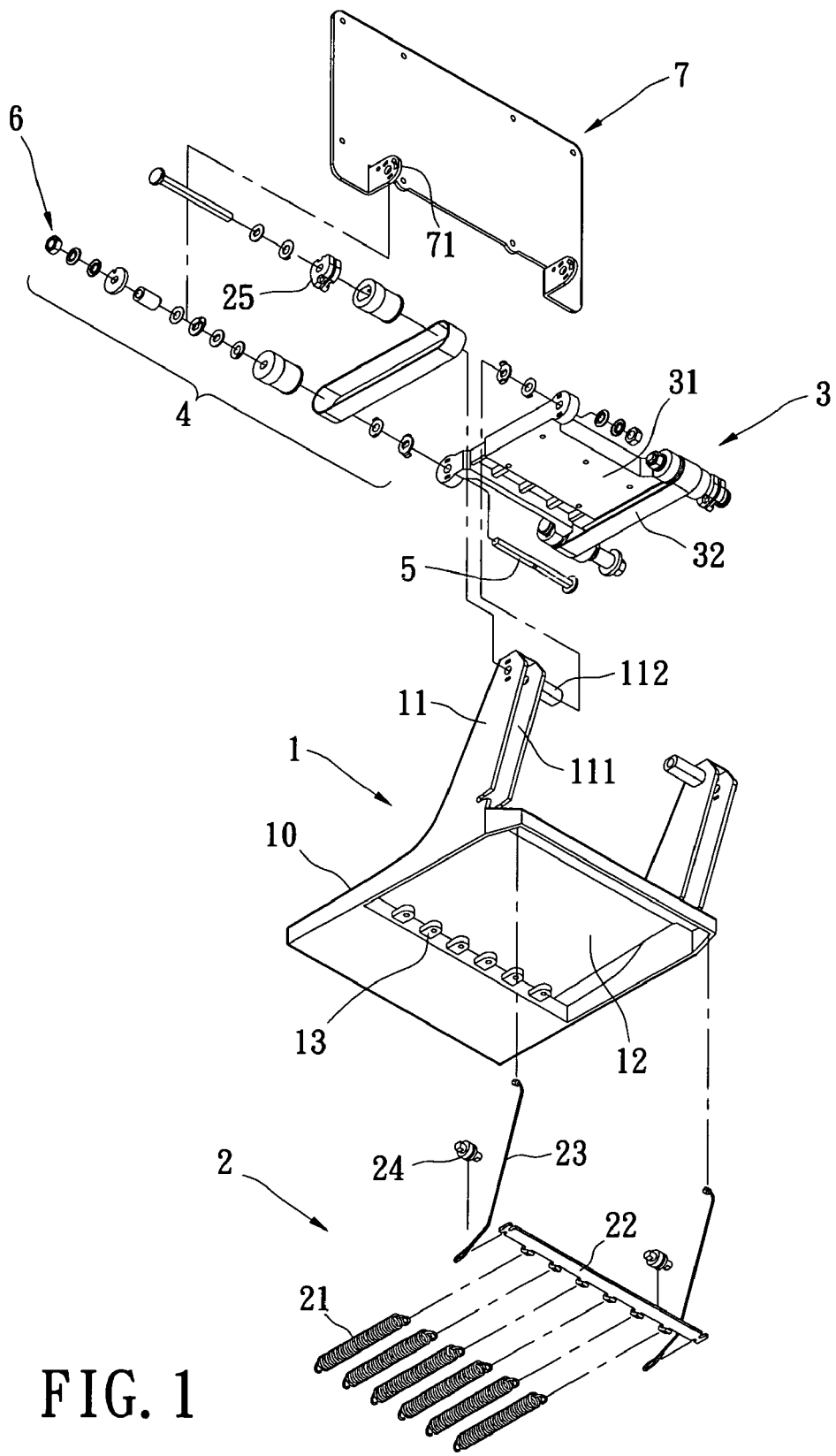
FIG. 1 is an exploded perspective view showing the supporting rack having a compensating mechanism of the present invention.

Please refer to FIGS. 1 to 6. The present invention provides a supporting rack having a compensating mechanism, which includes a rack body 1, an action force compensating assembly 2, a transmission element 3, a plurality of gasket sets 4, a plurality of bolts 5, a plurality of nuts 6 and a supporting plate 7.

Figure 2:
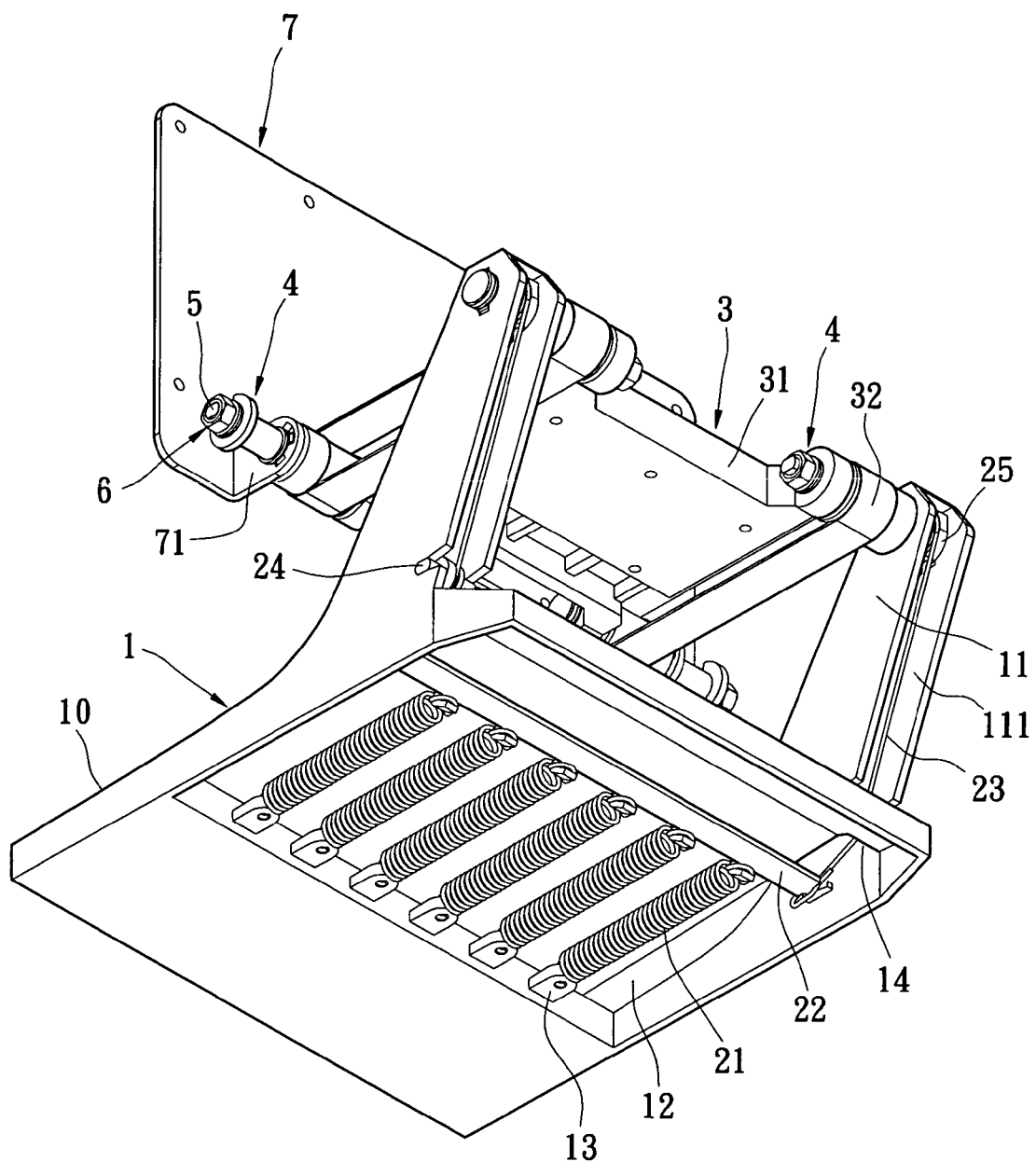
FIG. 2 is an assembled perspective view showing the supporting rack having a compensating mechanism of the present invention.
Figure 3:
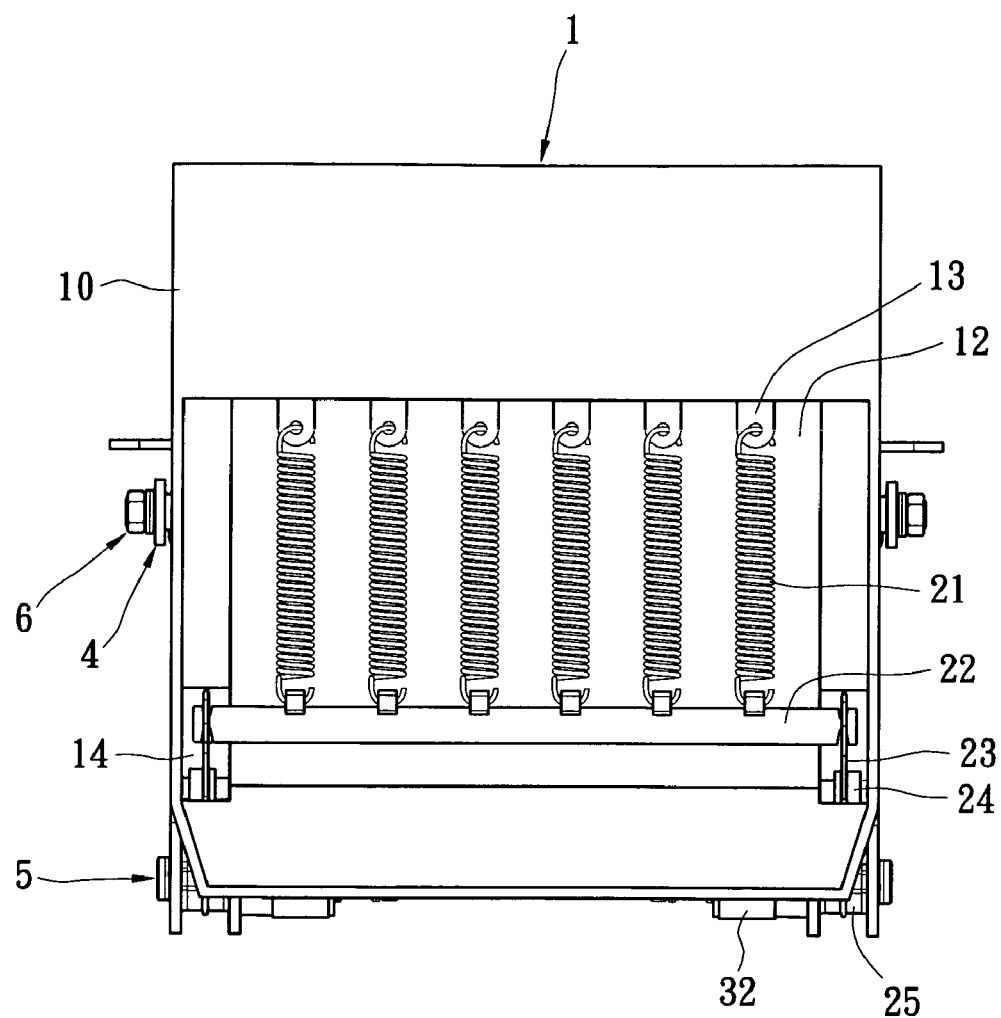
FIG. 3 is a bottom view showing the supporting rack having a compensating mechanism of the present invention.

Please refer to FIGS. 1 to 3. The rack body 1 has a base 10 and support arms 11 extending upwardly from the base 10. The number of the support arms 11 is determined according to the weight of an article that is supported by the supporting rack. In the present embodiment, there are two support arms 11. The base 10 has an accommodating space 12, protruding plates 13 and openings 14. The accommodating space 12 is formed by recessing the bottom of the base 10. In the present embodiment, there is a plurality of protruding plates 13, and they are arranged in the accommodating space 12. The openings 14 are provided in the base 10 at positions adjacent to the support arms 11.

The support arm 11 is formed by two plates with a cavity 111 between them. The number of the openings 14 corresponds to that of the support arms 11, and thus is two in the present embodiment. The openings are in communication with the accommodating space 12 and the cavities 111 of the two support arms 11 respectively.

The action force compensating assembly 2 is provided in the rack body 1. The action force compensating assembly 2 comprises at least one elastic element 21, a hooking plate 22, two dragging pieces 23, two turning pieces 24 and two rotating pieces 25. In the present embodiment, there is a plurality of elastic elements 21, which correspond to the protruding plates 13 and are provided in the accommodating space 12 of the base 10. The elastic element 21 is a tension spring. The hooking plate 22 is a transverse plate that is provided in the accommodating space 12 transversely to be adjacent to the two openings 14. The two dragging pieces 23 are metallic wires. The turning piece 24 is a disk body that is firmly mounted in the cavity 111 adjacent to the opening 14. The rotating piece 25 is provided in the cavity 111 to pivotally connect to the distal end of the support arm 11.

Please refer to FIG. 2. One ends of the elastic elements 21 are hooked to the protruding plates respectively. The other ends of the elastic elements 21 are hooked to one end of the hooking plate 22.

One ends of the two dragging pieces 23 are disposed in the accommodating space 12 to connect to both sides of the hooking plate 22. The other ends of the two dragging pieces 23 penetrate through the two openings 14 to connect to the rotating piece 25. Further, the dragging piece 23 is located in the cavity 111 to wrap around the periphery of the turning piece 24, so that the dragging piece 23 can be provided in the cavity 111 of the support arm 11 exactly.

Figure 4:
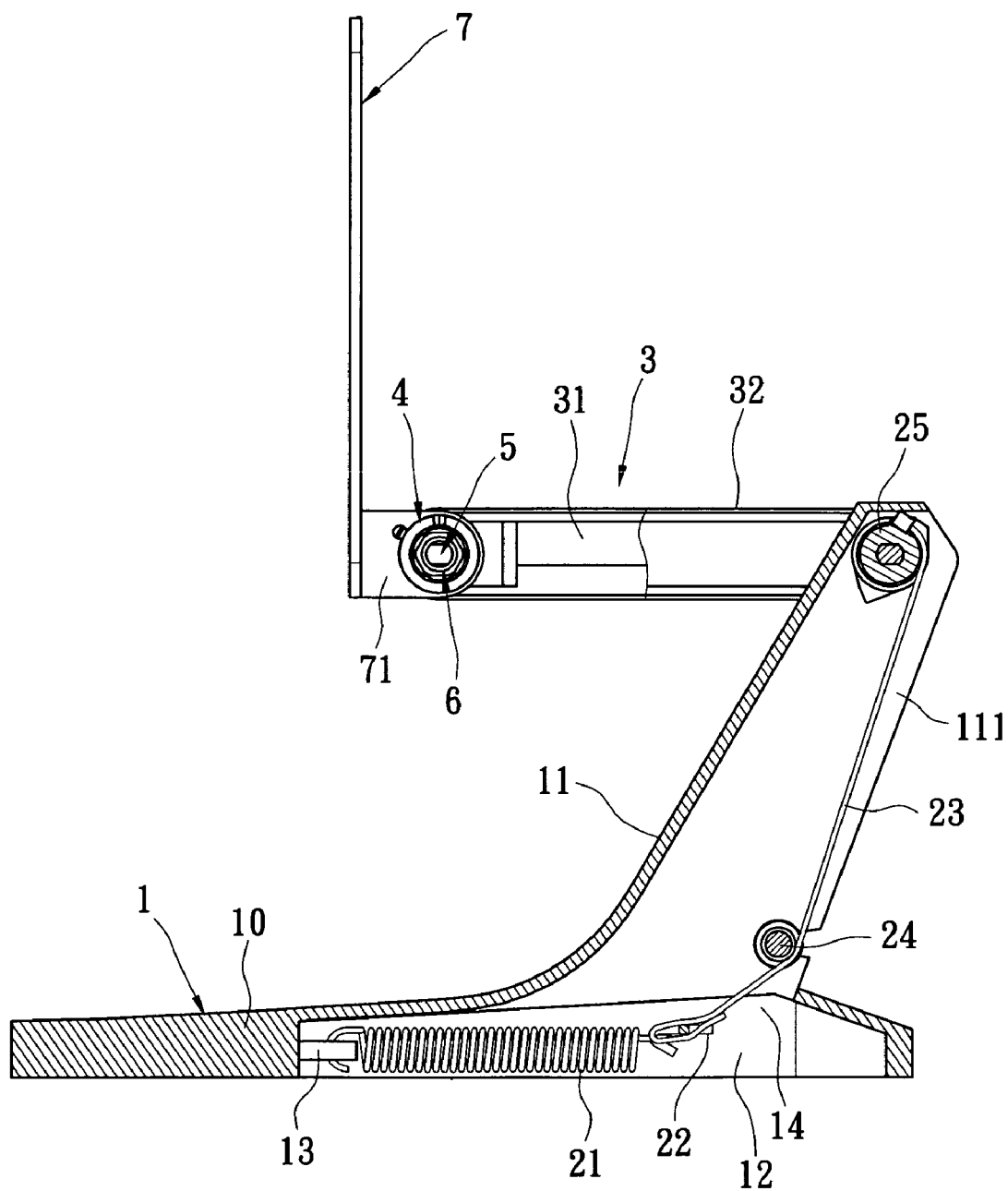
FIG. 4 is a side view showing the supporting rack having a compensating mechanism of the present invention.

Please refer to FIG. 4. The other end of the dragging piece 23 is firmly connected to an outer periphery of the rotating piece 25. Via this arrangement, when the rotating piece 25 rotates, the dragging piece 23 can drag the hooking plate 22 and the connected elastic elements 21 simultaneously via the movement of the turning piece 24 in the cavity 111.

The transmission element 3 has a driving plate 31 and two belts 32. The two belts 32 are disposed on both sides of the driving plate 31. One end of the driving plate 31 is firmly connected to the rotating piece 25, and is pivotally connected to the distal end of the support arm 11 together with the rotating piece 25.

The supporting plate 7 has two bending plates 71. The two bending plates 71 are formed by means of extending the supporting plate 7 to correspond to both sides of the driving plate 31. The bending plates are pivotally connected to the other end of the driving plate 31. The belts 32 can generate a restricting and driving effect to the supporting plate 7 during the action of the driving plate 31.

Please refer to FIG. 1. The gasket sets 4 comprise various kinds of gaskets that are provided to both ends of the driving plate 31 and the pivoting points between the bending plates 71 and the support arms 11. The gasket sets are locked the support arms 11 and the bending plates 71 via bolts 5 and nuts 6.

Incidentally, the gasket sets 4, the bolts 5 and the nuts 6 can cooperate with non-circular holes, sleeves and positioning holes or the like, so that the driving plate 31 and the supporting plate 7 can generate a restricting, slide-preventing and positioning effect.

Figure 5:
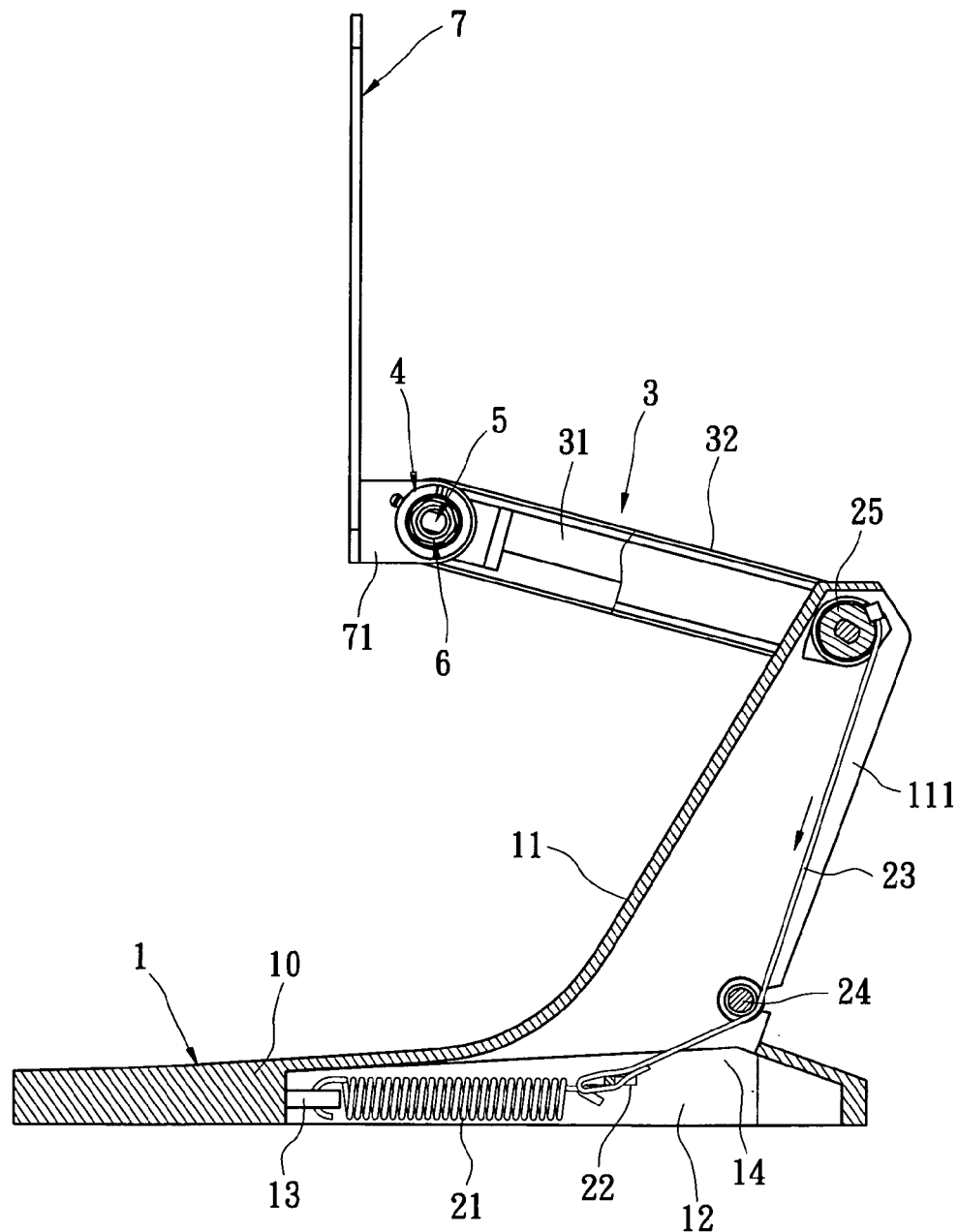
FIG. 5 is a schematic view showing the ascending action of the supporting rack having a compensating mechanism of the present invention.
Figure 6:
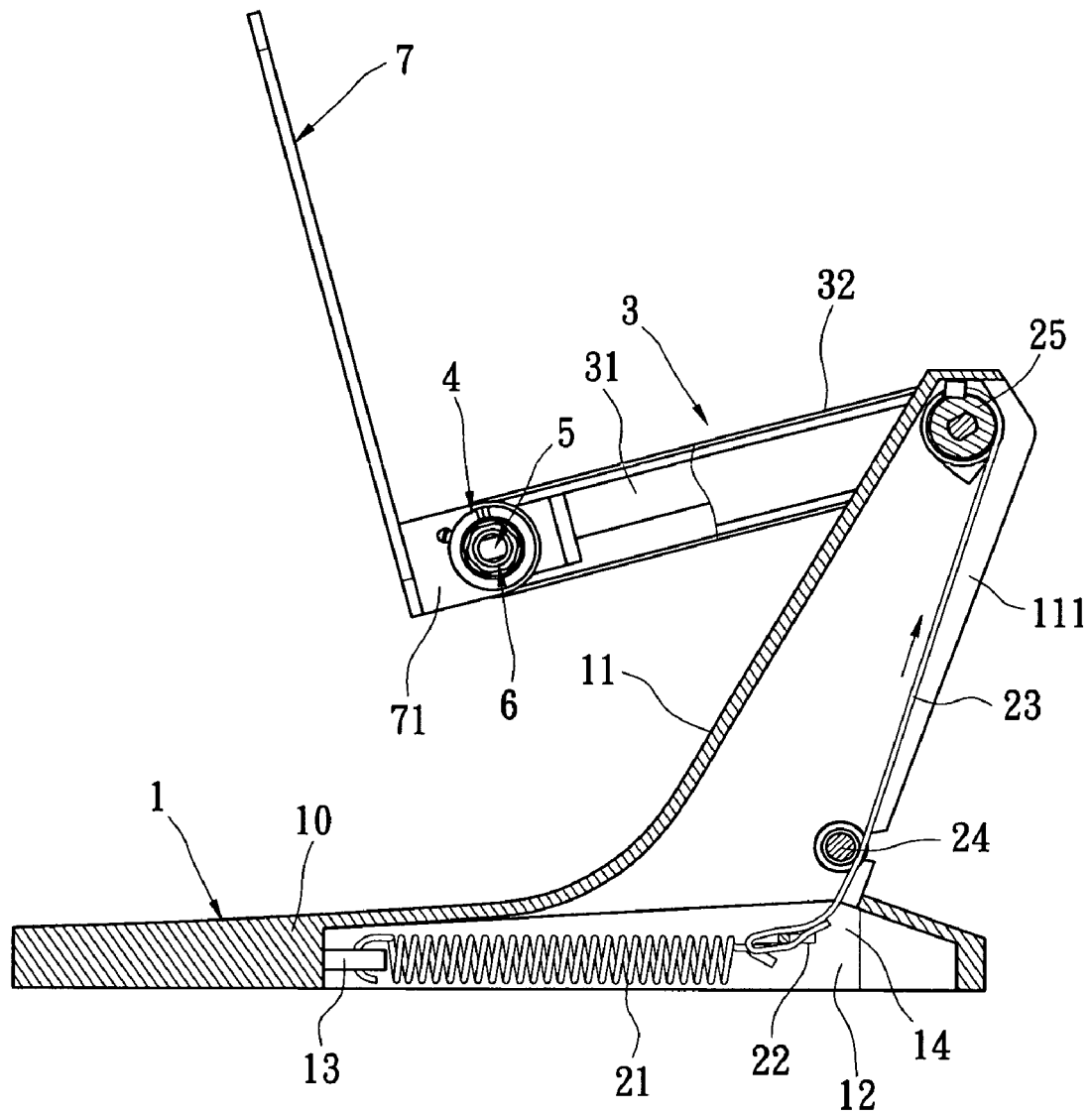
FIG. 6 is a schematic view showing the descending action of the supporting rack having a compensating mechanism of the present invention.

Please refer to FIGS. 4 to 6. Further, a display monitor or other electronic device (not shown) can be firmly connected on the supporting plate 7. When the user intends to adjust the angle of the display monitor to cause a vertical swinging of the driving plate 31, the rotating piece 25 pivotally connected to the distal end of the support arm 11 together with the driving plate 31 will rotate synchronously and thus drive the dragging pieces 23 and the connected hooking plate 22 and elastic elements 21. At this time, according to the action force applied by the dragging piece 23, the elastic element 21 can generate a tension or compression action. During the swinging of the driving plate 31 caused by the above action, the weight of the display monitor firmly connected to the supporting plate 7 can be counteracted directly or the action force can be increased.

The present invention has advantageous effects as follows. Via the action of the elastic element 21, an appropriate force can be applied to the supporting plate 7. When the user intends to adjust the supporting plate 7, the elastic element 21 can generate an effect for compensating the action force, so that the user can lift up the supporting plate 7 with a smaller force and can pull down the supporting plate 7 with a suitable force. In this way, the present invention has a better operation feeling and allows the user to position the supporting plate to a proper location smoothly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A supporting rack having a compensating mechanism, comprising:
   a rack body having a base and a pair of support arms extending upwardly from the base, each of the pair of support arms having a cavity formed therein;
   an action force compensating assembly provided in the rack body, the action force compensating assembly comprising at least one elastic element, a hooking plate, a pair of dragging pieces each having one end connected to the hooking plate and a pair of rotating pieces, both ends of the elastic element being respectively firmly connected to the base and the hooking plate, the pair of rotating pieces being respectively disposed in the cavities at a distal end portion of a corresponding one of the support arms, an opposing end of each dragging piece being connected to an outer periphery of a corresponding one of the rotating pieces;
   a transmission element, one end thereof being firmly connected to the rotating pieces and pivoted on the support arms; and
   a supporting plate connected to another end of the transmission element.

2. The supporting rack having a compensating mechanism according to claim 1, wherein the base has an accommodating space and openings formed in correspondence with the cavities, the accommodating space being formed by recessing a bottom of the base, and the openings being in open communication with the accommodating space and the cavities of the support arms.

3. The supporting rack having a compensating mechanism according to claim 2, wherein the hooking plate is provided in the accommodating space, the one end of the dragging piece being hooked to the hooking plate, and the other end of the dragging piece penetrates through the opening to connect to the rotating piece.

4. The supporting rack having a compensating mechanism according to claim 3, wherein the dragging piece is a metallic wire.

5. The supporting rack having a compensating mechanism according to claim 3, wherein the cavity of the support arm is provided therein with a turning piece, and the dragging piece is wrapped around a peripheral surface of the turning piece.

6. The supporting rack having a compensating mechanism according to claim 3, wherein the accommodating space of the base has at least one protruding plate therein and a corresponding end of the elastic element being connected to the protruding plate.

7. The supporting rack having a compensating mechanism according to claim 6, wherein the elastic element is a tension spring.

8. The supporting rack having a compensating mechanism according to claim 1, wherein the transmission element has a driving plate, one first end of the driving plate being pivotally connected to the support arm and an opposing second end of the driving plate being pivotally connected to the supporting plate.

9. The supporting rack having a compensating mechanism according to claim 8, wherein a plurality of gaskets are respectively included in the pivotal connections on the first and second ends of the driving plate.

10. A supporting rack having a compensating mechanism, comprising:
   a rack body having a base and a pair of support arms extending upwardly from the base;
   an action force compensating assembly provided in the rack body, the action force compensating assembly comprising at least one elastic element, a hooking plate, a pair of dragging pieces each having one end connected to the hooking plate and a pair of rotating pieces, both ends of the elastic element being respectively firmly connected to the base and the hooking plate, the rotating pieces being respectively provided on the support arms, an opposing end of each dragging piece being connected to an outer periphery of a corresponding one of the rotating pieces;
   a transmission element including a driving plate having one first end thereof pivotally connected to the support arms through respective connection to the rotating pieces; and
   a supporting plate pivotally connected to an opposing second end of the driving plate.

11. The support rack having a compensating mechanism according to claim 10, wherein a plurality of gaskets are respectively included in the pivotal connections on the first and second ends of the driving plate.

* * * * *